United States Patent [19]

Andrew et al.

[11] Patent Number: 4,856,769
[45] Date of Patent: Aug. 15, 1989

[54] APPARATUS FOR CONVEYING SHEETS

[75] Inventors: Edward D. Andrew, Dinckley; Peter Hayhurst, Tottington, both of United Kingdom

[73] Assignee: Edward W. Andrew, Ltd., Bury, United Kingdom

[21] Appl. No.: 117,877

[22] Filed: Nov. 9, 1987

[30] Foreign Application Priority Data

Nov. 8, 1986 [GB] United Kingdom ............... 8626718

[51] Int. Cl.⁴ ............................................. B65H 29/16
[52] U.S. Cl. ..................................... 271/193; 271/18.1; 271/901; 198/191; 226/94
[58] Field of Search ...................... 271/193, 901, 18.1; 226/94; 198/691

[56] References Cited

U.S. PATENT DOCUMENTS

| | | | |
|---|---|---|---|
| 2,316,824 | 4/1940 | Tobias et al. | 175/264 |
| 2,568,824 | 9/1951 | Rahbek | 226/94 X |
| 2,576,882 | 11/1951 | Koole | 198/1 |
| 3,017,982 | 1/1962 | Sittel | 198/1 |
| 3,371,247 | 2/1968 | Mullenger | 317/2 |
| 3,528,592 | 9/1970 | White | 226/5 |
| 3,690,646 | 9/1972 | Kolibas | 271/45 |
| 3,832,053 | 8/1974 | Goel | 226/94 X |
| 4,244,465 | 1/1981 | Hishikawa | 271/193 X |
| 4,572,359 | 2/1986 | Fujita et al. | 198/819 |

FOREIGN PATENT DOCUMENTS

| | | | |
|---|---|---|---|
| 951337 | 3/1964 | United Kingdom . | |
| 2067523 | 7/1981 | United Kingdom | 271/193 |
| 2196927 | 5/1988 | United Kingdom | 198/691 |

Primary Examiner—Richard A. Schacher
Attorney, Agent, or Firm—Laurence R. Brown; Alfred J. Mangels

[57] ABSTRACT

A conveyor surface composed of a single belt, a plurality of belts or of other structures such as a plurality of panels or other moving surface, or a fixed surface over which sheets of non-conductive material as paper or textiles can be caused to travel or can slide. The surface is composed of two sets of areas, intermingled in one of several ways, the two sets of areas being of material of opposite electrostatic properties (spaced apart on the triboelectric scale) so that when a sheet is conveyed the two sets of areas develop opposite electrostatic reaction to the sheet to give an overall zero or near-zero electrostatic resultant force on the sheet or other item being conveyed.

30 Claims, 3 Drawing Sheets

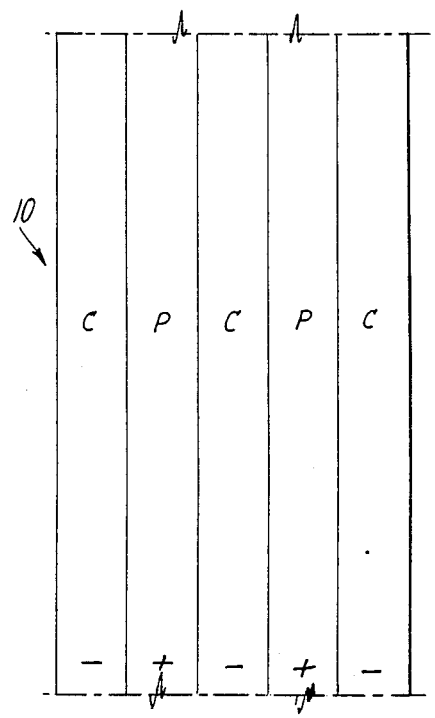
FIG.1
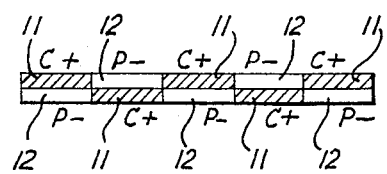
FIG.2
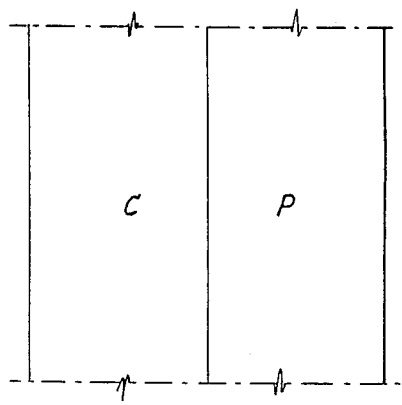
FIG.3
FIG.4

APPARATUS FOR CONVEYING SHEETS

BACKGROUND OF THE INVENTION

1. Field of the Invention

This invention relates to apparatus for conveying sheet materials, and particularly for conveying substantially electrically-non-conductive sheet materials such as plastics films or textile sheets.

2. Description of the Related Art

One particular application is in the field of folding machines for laundries, wherein hot sheets from a drying/ironing machine pass to a three-conveyor folding assembly. Each of the conveyors consists of a plurality of parallel, spaced apart belts entrained about rollers. The belts are usually of textile material and, the arriving sheets being hot and dry operate under hot and dry conditions. This, plus the high speeds, such as 40 m per minute, of the belts, create ideal conditions for static electricity to build up on the surfaces of the belts. In addition, the sheets from the dryer/ironer also travel quickly and are hot and dry. Thus, both the belts and the material being conveyed, ie the sheets, can and usually do, become highly charged with static electricity.

As is well known, the charge which develops on the surface of a particular material is characteristic of the material, and that material with which it is in frictional contact, in accordance with the Triboelectric series which is reproduced below.

| TRIBOELECTRIC SERIES |
| --- |
| Positive |
| Wool |
| Nylon |
| 5. Viscose |
| Cotton |
| Silk |
| Acetate |
| Perspex |
| 10. Polyvinyl Alcohol |
| Polyester |
| Acrylic |
| Polypropylene |
| P V C |
| 15. Acrylic co-Polymer |
| Polyvinylidene Chloride |
| Leather |
| Polythene |
| Teflon |
| 20. Negative |

For example, it will be apparent that cotton fabric (cotton being higher than polyester in the series) can develop a positive charge under certain circumstances whereas polyester fabric could develop a negative charge under the same circumstances. It might be assumed from this that a polyester/cotton blend could be found which developed no charge. Unfortunately, this is not true, any blend always has a slight bias towards negative or positive, and once the charge appears it increases quickly.

In the aforesaid folding machine, it has been common practice to use belts made of cotton. Sheets, over the years, have usually also been made of cotton and there has been no problem with static electricity. This is a result of the nature of the materials and the nature of the machine. At a fold nip of the machine, it is desirable that a sheet passes off an end of a top conveyor and hangs free alongside a lower adjacent conveyor until its midpoint is level with the fold nip between the two belts. When this occurs, a jet of air is activated to blow the centre of the sheet into the fold nip. If the belts and the sheets are of the same polarity of static, ie both negative in this case, there is a repulsive force at the nip which aids in keeping the sheet out of the nip. If, however, the sheet and the belts are of opposite polarities there is an attraction which can cause a hanging sheet end to enter the fold nip prematurely. It will be appreciated that with belts and sheets both of cotton, no problems arose in the past. However, with the advent of polyester fibre sheets and blends thereof, belts and sheets have been of opposite static polarities and have caused attraction at the fold nip with consequent premature folding. It will be appreciated that if sheets could be sorted into cotton and polyester types, and each folded on a separate machine, no problem would arise. However, such sorting is time consuming and expensive, and is often impractical, for example in a laundry having only one folding machine. Additionally, the aforesaid problem can cause delay and difficulty if the problem is not diagnosed rapidly, because a machine operating perfectly on one sort of sheet may suddenly begin to malfunction when a different sort of sheet passes through it, which sheet might be visually indistinguishable from the rest. This can cause stoppages and delays whilst some imagined fault is investigated.

It has been proposed to use belt fabrics which are highly conductive, in that they contain metallic or carbon filaments intended to dissipate electrostatic charges to earth in the machine. This does not work, especially with very fast machines, as the remainder of the fabric in the belt becomes charged and cannot dissipate the charge quickly enough.

An object of the present invention therefore, is to provide an improved belt for conveying substantially electrically-non-conductive material and an improved conveyor for this purpose.

Summary of the Invention

The invention provides conveying apparatus having a first area of a material having first electrostatic properties and a second area of a material having electrostatic properties opposite to these of the first area.

The conveying apparatus can have its areas in the form of longitudinal stripes.

Each area can be divided into discrete parts, and each part can be wholly or partly surrounded by comparable parts of the second area.

The conveying apparatus can have a check or comparable pattern providing the two areas divided into discrete parts.

The invention further provides a conveyor including plurality of side-by-side belts divided into two pluralities of groups, the two groups alternating across the width of the conveyor and each group in one plurality having surface electrostatic properties of polarity opposite to those properties of each group in the other plurality.

In the simplest case, there is one belt in each group and the belts are thus, across the machine, alternately of positive and negative polarity.

The invention also provides a conveyor belt having two discrete area sets each including a number of areas, each area in each set being of a material whose electrostatic properties are of polarity opposite to the polarity of the electrostatic properties of each area in the other set.

The number of areas in each set can be one or more.

The areas of the two sets should be distributed relatively uniformly about the belt, and the total area of one should not exceed the total area of the other set by a great margin, these criteria being met when the belt is considered in the longitudinal direction. It will be understood that excess imbalance in the set area size or distribution in the longitudinal direction will result in a belt which has alternating electrostatic properties along its length, which can cause conveying problems.

The areas in the belt can be of different yarns in a textile belt, or of different elastomers in an elastomeric belt of flexible rubber and/or plastics material. One of the sets of areas can be provided by a base layer of material and the other set can be provided by areas applied to said base layer, for example, by adhesive, painting or comparable means. The base layer could be of textile material and the second set of polymeric material adhered t thereto or sprayed thereonto.

Area alternation longitudinally of the belt can cause a longitudinal alternation in static properties. At large amplitudes such variation might cause undesirable macro-changes in the way the belts and the material being conveyed interract, at small amplitudes it is expected that the conveyed material will oscillate as it leaves or meets the belt. Such oscillation or flutter may be disadvantageous, in which case it should be eliminated by using a very short frequency longitudinal variation, (very close transverse stripes) or having no longitudinal variation, e.g. by having longitudinal stripes. There may be applications, however, wherein such oscillation or flutter is an advantage.

BRIEF DESCRIPTION OF THE DRAWING

The invention will be described further, by way of example, with reference to the accompanying drawings, wherein;

FIG. 1 is a fragmentary plan view of a first preferred embodiment of conveying apparatus in accordance with the invention;

FIG. 2 is a schematic cross-sectional view through the embodiment of FIG. 1;

FIG. 3 is a view similar to FIG. 1 but showing a second embodiment;

FIG. 4 is a view similar to FIG. 1 but showing a third embodiment;

DESCRIPTION OF THE PREFERRED EMBODIMENTS

Throughout the drawings individual areas or parts of areas of conveying surfaces have been designated 'c' or 'p' to designate their being of a material generating a positive surface static charge or of a material generating a negative surface static charge. These designations arise from the fact that typical materials of these natures are cotton and polyester. However, it must be stressed that the invention is not limited to cotton and polyester and any of a wide range of materials can be used in the belts and conveyors in accordance with the invention.

The method of manufacture of conveying surfaces in accordance with the invention is not really of relevance to the present invention as it is their final properties which matter. It should perhaps be stated, however, that textile belts can be woven, knitted, warp knitted, felted, or formed by other "non-woven" processes. Different areas in these belts can be of different yarns or different fibres. Also belts can be formed from different types of rubber or plastics elastomers by moulding, adhesion or curing together. A base layer can underlie a functioning layer if desired. A belt can be made by attaching a second group of areas to a base belt.

FIG. 1 shows a woven belt 10 which may be some 60 mm wide and has each surface divided into five stripes by appropriate weaving including polyester and cotton warps. On one surface the upper in FIG. 2, there are three stripes 11 of 'cotton' and two stripes 12 of 'polyester'. The inverse condition prevails on the underside to enable the user to select a differently biassed belt, towards positive or negative, by reversing his belts.

FIG. 2 is a cross-sectional view of the belt of FIG. 1, showing the inverse condition referred to above.

FIG. 3 shows a belt wherein a chequerboard array of two different sets of areas are formed. The areas in one set designated C, and the areas of the other set designated P. The pattern on the belt underside (not shown), can be the same or an inverse thereof.

FIG. 4 shows a belt which has two strips only along its length, again designated C and P.

This is a limiting case wherein each set of areas includes only one area, or each area has only one part.

Figure 5:
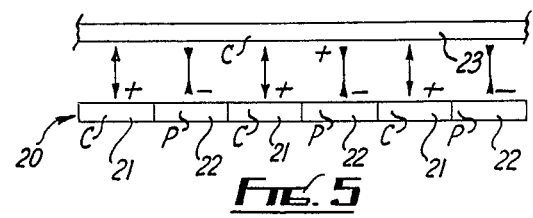
FIG. 5 is a cross-sectional view illustrating a belt in accordance with the invention in use with a sheet of one polarity.
Figure 6:
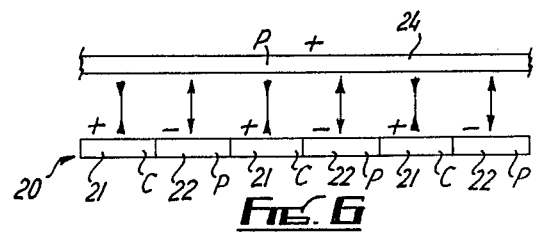
FIG. 6 is a similar view but showing a sheet of a second polarity.

FIGS. 5 and 6 illustrate how a belt 20 of the invention, comparable with belt 10, works in practice. The disadvantage of "attraction" in folding machines (ie the occurrence of different charges on conveyed items (sheets) and on the belts) has already been described. FIG. 5 shows the belt 20 having on each surface three stripes 21 of "positive charge ('C'—eg. cotton) and three stripes 22 of "negative" charge 'P' eg Polyester). With a cotton sheet 23 near the belt 20 it will be seen that there are three repulsion forces arising from the stripes 21 and indicated by divergent arrow signs, and three attractive forces indicated by three convergent arrow signs. As the respective areas are about equal the resultant force on the sheet is about zero and thus it neither draws away from nor tends towards the conveyor, even though it is highly charged with static electricity. FIG. 6 shows the comparable situation with a polyester or poly/cotton blend sheet 24. It will be seen that the net force is again zero despite the charge on the sheet 24 being opposite that on sheet 23. Thus, conveyed material (sheets are the example) can be conveyed and handled in accordance with the machine flow paths and characteristics and irrespective of their nature which causes different static charges.

Figure 7:
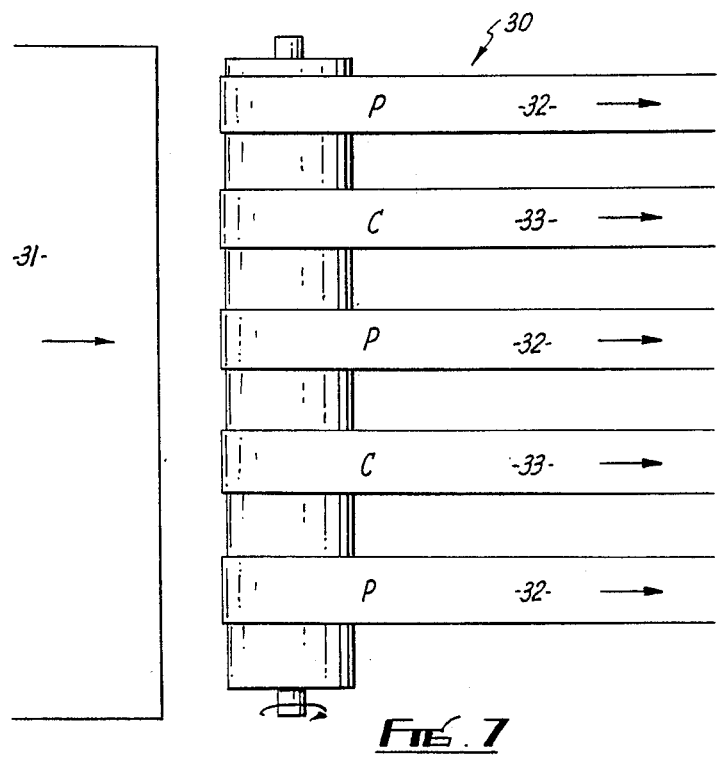
FIG. 7 is a plan view of part of a conveyor in accordance with the invention.

FIG. 7 shows how the same principle can be applied to a conveyor 30 for sheets 31 by having belts 32 of negative 'P' (eg polyester) material alternated with belts 33 of positive 'C' (eg cotton) material across the conveyor width. This is a limiting case where there are two pluralities of groups of belts. Each group is a single belt 32 or 33. One plurality comprises all belts 32, and the other plurality comprises all belts 33. Naturally, the number, spacing and size of belts 31, 32 can be varied as desired. However, by having alternating groups, the net static effect on a conveyed sheet 31 can be close to or at zero.

Figure 8:
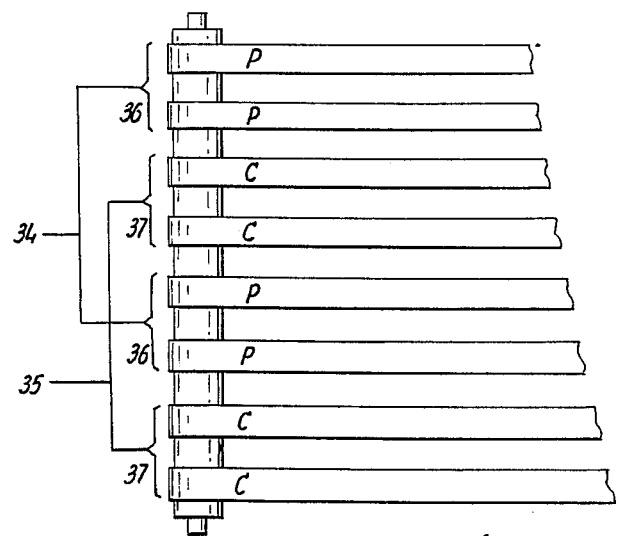
FIG. 8 is a similar view of a second conveyor in accordance with the invention.

FIG. 8 shows a variation where belts are in pairs. A first plurality of groups of belts is designated 34 and a second plurality of groups is designated 35. Each group within plurality 34 consists of two belts and is designated 36. Each group within plurality 35 consists of two belts and is designated 37. The belts in groups 36 are "negative" 'P' (eg polyester) and the belts in groups 37 are 'positive' 'C' (eg cotton). The function of this belt is the same as that of FIG. 7. It will be appreciated that the number of belts in each group can vary. The number of belts in the groups of the first plurality can be different from the number of belts in the second plurality; for example a 3'P', 2'C', 3'P', 2'C' arrangement could be provided, or a 3'P', 2'C', 1'P', 2'C', 3'P', or an inverse could be provided.

Figure 9:
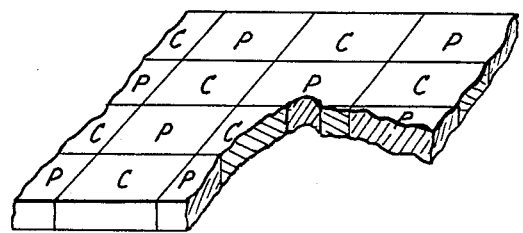
FIG. 9 is a fragmentary view of a fourth belt embodiment in accordance with the invention.
Figure 10:
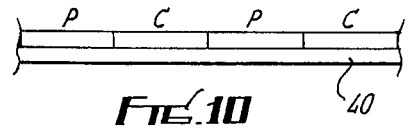
FIG. 10 is a cross-sectional view showing a fifth belt embodiment in accordance with the invention.
Figure 11:
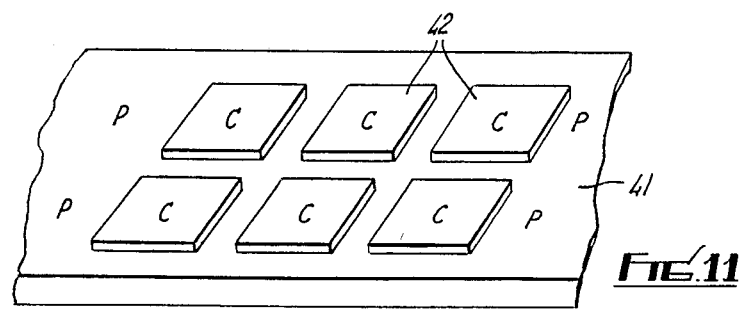
FIG. 11 is a perspective view showing a sixth belt embodiment in accordance with the invention.

FIG. 9 shows how comparable different areas can be formed within a belt of elastomeric material by having different sorts of elastomer in a belt. FIG. 10 shows how different areas can be supported on a base web 40. FIG. 11 shows how a base web 41 can constitute a first area or set of areas and secondary parts 42 can be adhered, coated, sprayed, printed, or otherwise formed thereon can constitute a second area or set of areas.

Other variations can be made within the scope of the invention. For example, although textile sheet conveying has been described as an example, the conveying of any type of non-conducting sheet material wherein static may have effect can be relevant. For example, the invention can have applications in the transportation of paper sheets, films and foils of non-textile plastics materials, webs and sheets of plastics laminates and many other materials.

The invention also applies to surfaces over which sheets can slide, i.e., surfaces which are fixed conveying surfaces rather than moving conveying surfaces. The invention is also relevant to the conveying positively or as a slide surface, of materials other than sheets, for example of particulate material such as plastics granules, sawdust or like materials which can be affected by electrostatice influences.

What is claimed is:

1. Apparatus for conveying sheets of substantially non-conducting material susceptible to electrostatic forces, said apparatus including a conveying surface of substantially electrically non-conductive materials, divided into areas, some of said areas being of a material whose triboelectric properties place it in a first position in a triboelectric series and others of said areas being of a material whose triboelectric properties place it in a second position in said triboelectric series, said second position being spaced from said first position, the areas being arranged so that when conveying a charged sheet electrostatic repulsion forces and electrostatic attraction forces between the said sheet and said conveyor surface essentially balance to ensure that essentially no net electrostatic force influences said sheet towards or away from said conveyor surface.

2. Apparatus as set for in claim 1, wherein the areas of electrically-non-conductive materials are in the form of longitudinally extending stripes to define said conveying surface.

3. Apparatus as set forth in claim 1, wherein each area of electrically-non-conductive material is divided into discrete parts.

4. Apparatus as set forth in claim 3, wherein each said part of one area is substantially completely surrounded by parts of a second area.

5. Apparatus as set forth in claim 3, wherein each said part of one area is partly surrounded by parts of a second area.

6. Apparatus as set forth in claim 3, wherein the conveying surface has a pattern defined by two areas of substantially electrically-non-conductive materials, each area divided into discrete parts.

7. Apparatus as set forth in claim 6, wherein the pattern is defined by rectangular areas.

8. Apparatus as set forth in claim 1, wherein the different areas are selected from the group consisting of: different textile fibres; different mixtures of textile fibres; different plastics; and different elastomers.

9. Apparatus as set forth in claim 1, wherein one of said areas is defined by a base layer of one material and said other area is defined by areas of a second material applied to said base layer.

10. Apparatus as set forth in claim 9, wherein said second areas are applied by a method selected from the group consisting of adhesive attachment, painting and printing.

11. Apparatus as set forth in claim 9, wherein said base layer is of textile material and said other area is defined by areas of polymeric material adhered to said base layer.

12. Apparatus as set forth in claim 9, wherein the base layer is of textile material and said other area is defined by areas of polymeric material sprayed onto said base layer.

13. Apparatus as set forth in claim 1, wherein the conveying surface is defined by a longitudinal variation in area alternation to reduce oscillation of conveyed material as it leaves and enters into contact with the conveying surface.

14. Apparatus as set forth in claim 1, where the conveying surface is defined by a large amplitude longitudinal area variation to provide desired degree of oscillation as a conveyed sheet leaves and enters into contact with the conveying surface.

15. Apparatus as set forth in claim 1, wherein said conveying surface includes a multiplicity of side-by-side belts, divided into two pluralities of groups, said two groups alternating across the width of the apparatus and each group of belts in one plurality having surface electrostatic properties of polarity opposite to those properties of each group of belts in the other plurality.

16. Apparatus as set forth in claim 15, wherein there is a single belt in each group and the belts are, considered transversely of the conveyor, alternately of positive and negative electrostatic properties.

17. Apparatus as set forth in claim 16, wherein there are at least two belts in each group and there are a plurality of groups.

18. Apparatus as set forth in claim 15, wherein the different belt surfaces are selected from the group consisting of: different textile fibres; different mixtures of textile fibres; different plastics; and different elastomers.

19. Apparatus as set forth in claim 1, and having a conveying surface defined by a conveyor belt having two discrete surface area sets, each said surface area set including a number of surface areas, and each surface area in each said surface area set having a surface which is of a material whose electrostatic properties are of polarity opposite to the polarity of the electrostatic properties of each surface area in the other surface area set.

20. Apparatus as set forth in claim 19, wherein the number of surface areas in each surface area set is one.

21. Apparatus as set forth in claim 20, wherein there is a multiplicity of surface areas in each surface area set.

22. Apparatus as set forth in claim 19, wherein the surface areas of the two sets are distributed uniformly over the conveying surface.

23. Apparatus as set forth in claim 19, wherein the total surface area of one set does not significantly exceed the total surface area of the other set considered in the longitudinal direction of the belt.

24. Apparatus as set forth in claim 19, wherein the different surface areas are selected from the group consisting of: different textile fibres; different mixtures of textile fibres; different plastics; and different elastomers.

25. Apparatus as set forth in claim 19, wherein one of the sets of surfaces areas is provided by a base layer of material and the other surface area set is provided by areas applied to said base layer.

26. Apparatus as set forth in claim 19, wherein said second surface areas are applied by a method selected from the group consisting of adhesive attachment, painting and printing.

27. Apparatus as set forth in claim 25, wherein said base layer is of textile material and said second set of surface areas are areas of polymeric material adhered to the base layer.

28. Apparatus as set forth in claim 25, wherein said base layer is of textile material and said second set of surface areas are areas of polymeric material sprayed onto the base layer.

29. Apparatus as set forth in claim 19, wherein the conveying surface is defined by a longitudinal variation in area alternation to reduce oscillation of conveyed material as it leaves and enters into contact with the conveying surface.

30. Apparatus as claimed in claim 19, wherein the conveying surface is defined by a large amplitude longitudinal area variation to provide a desired degree of oscillation as a conveyed sheet leaves and enters into contact with the conveying surface.

* * * * *